United States Patent
Collazo et al.

(10) Patent No.: US 9,725,063 B2
(45) Date of Patent: Aug. 8, 2017

(54) HORN SYSTEM

(71) Applicant: Dalphi Metal Espana S.A., Madrid (ES)

(72) Inventors: Angel Collazo, Vigo (ES); Luis Barandela, Vigo (ES); Joaquin Grana, Vigo (ES); Ruben Barros, Vigo (ES)

(73) Assignee: Dalphi Metal Espana S.A. (ES)

( * ) Notice: Subject to any disclaimer, the term of this patent is extended or adjusted under 35 U.S.C. 154(b) by 0 days.

(21) Appl. No.: 14/623,005

(22) Filed: Feb. 16, 2015

(65) Prior Publication Data

US 2015/0307051 A1   Oct. 29, 2015

(30) Foreign Application Priority Data

Feb. 17, 2014  (EP) .................................. 14000558

(51) Int. Cl.
| | | |
|---|---|---|
| *B60R 21/216* | (2011.01) | |
| *B60R 21/2165* | (2011.01) | |
| *B60Q 5/00* | (2006.01) | |
| *B60R 21/203* | (2006.01) | |

(52) U.S. Cl.
CPC ........ *B60R 21/21658* (2013.01); *B60Q 5/003* (2013.01); *B60R 21/2032* (2013.01); *B60R 21/2037* (2013.01)

(58) Field of Classification Search
CPC .......... B60R 21/21658; B60R 21/2037; B60R 21/2032; B60Q 5/003
See application file for complete search history.

(56) References Cited

U.S. PATENT DOCUMENTS

| | | | | |
|---|---|---|---|---|
| 5,327,796 A | * | 7/1994 | Ernst ...................... | B60Q 5/003 200/61.55 |
| 5,593,178 A | * | 1/1997 | Shiga ...................... | B60Q 5/003 200/61.55 |
| 6,675,675 B1 | | 1/2004 | Sauer et al. | |
| 6,719,323 B2 | * | 4/2004 | Kai ...................... | B60R 21/2037 200/61.54 |
| 7,159,898 B2 | * | 1/2007 | Thomas .............. | B60R 21/2037 200/61.55 |
| 7,173,202 B2 | * | 2/2007 | Tsujimoto ........... | B60R 21/2037 200/61.54 |

(Continued)

FOREIGN PATENT DOCUMENTS

| | | |
|---|---|---|
| DE | 199 27 032 | 12/2000 |
| DE | 100 16 514 | 10/2001 |

(Continued)

*Primary Examiner* — Drew Brown
(74) *Attorney, Agent, or Firm* — Tarolli, Sundheim, Covell & Tummino LLP

(57) ABSTRACT

The present invention provides a horn system (1) for a vehicle, comprising an airbag module (7) and a cover (3) for receiving and covering the airbag module (7), wherein the cover (3) is moveable relative to the airbag module (7), and a horn circuit (17) for producing a warning signal in response to moving the cover (3) relative to the airbag module (7). The horn system according to the present invention is characterised in that it comprises at least one conductive element (21, 22) attached to a housing (8) of the airbag module (7) and displaceable between an assembling position and a holding position, wherein the conductive element (21, 22) is configured to interact with the cover (3) in the holding position.

22 Claims, 5 Drawing Sheets

(56) References Cited

U.S. PATENT DOCUMENTS

Figure 1:
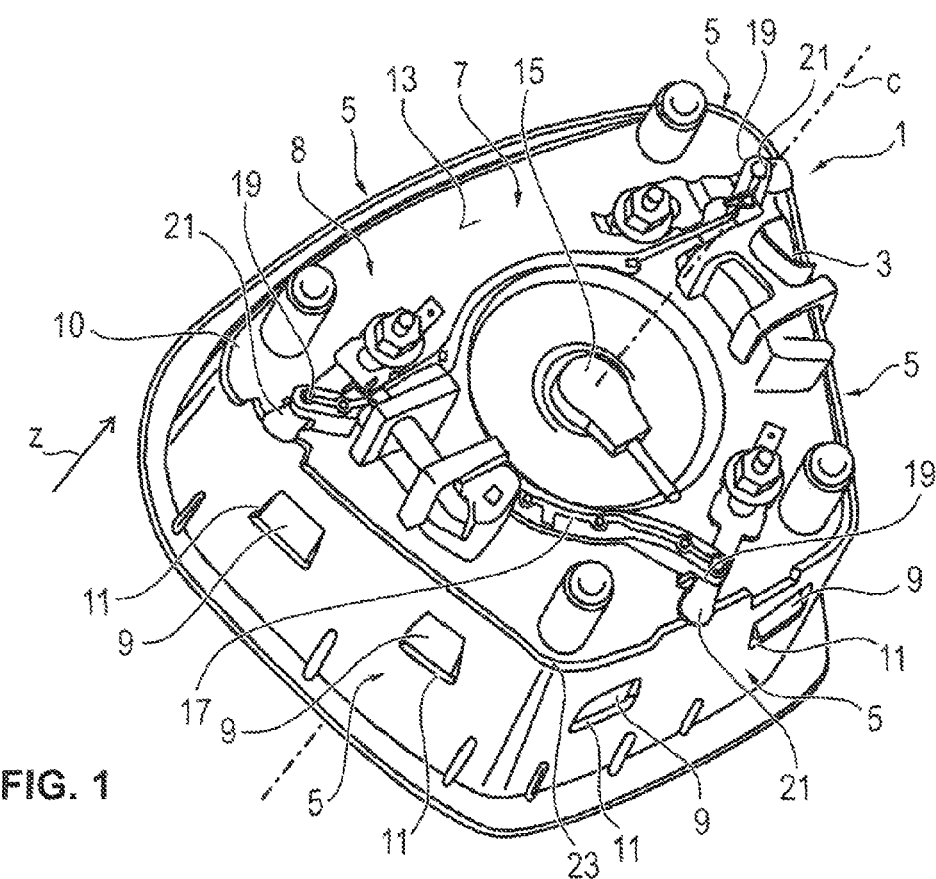

| | | | | |
|---|---|---|---|---|
| 7,232,966 | B2* | 6/2007 | Burgard | ................ B60Q 5/003 |
| | | | | 200/61.54 |
| 7,621,560 | B2* | 11/2009 | Spencer | ............. B60R 21/2037 |
| | | | | 200/61.54 |
| 7,784,825 | B2* | 8/2010 | Frisch | ................ B60R 21/2035 |
| | | | | 200/61.55 |
| 2003/0151237 | A1 | 8/2003 | Xu et al. | |
| 2004/0046367 | A1* | 3/2004 | Schneider | ........... B60R 21/2037 |
| | | | | 280/728.2 |
| 2004/0178611 | A1 | 9/2004 | Simpson | |
| 2005/0012311 | A1* | 1/2005 | Schneider | ........... B60R 21/2037 |
| | | | | 280/731 |
| 2007/0045996 | A1 | 3/2007 | Frisch | |
| 2010/0059973 | A1 | 3/2010 | Fujita | |

FOREIGN PATENT DOCUMENTS

| | | |
|---|---|---|
| JP | 2001-213326 | 8/2001 |
| WO | 98/15431 | 4/1998 |
| WO | 2007/145549 | 12/2007 |

\* cited by examiner

HORN SYSTEM

RELATED APPLICATION

This application claims priority from European Patent Application No. 14000558.8, filed Feb. 17, 2014, the subject matter of which is incorporated herein by reference.

BACKGROUND OF THE INVENTION

The present invention relates to a horn system according to the preamble of claim 1 and to a vehicle according to claim 15.

Horn systems for vehicles are generally known in the art. They are used to produce a warning signal for road safety reasons. In the majority of modern vehicles, the horn system comprises an airbag module and a cover for receiving and covering the airbag module. The cover is usually a "floating cover", which means that the cover is to some extend moveable relative to the airbag module. Furthermore, horn systems of the prior art comprise a horn circuit for producing a warning signal in response to moving the cover relative to the airbag module. Floating cover airbags of the slate of the art require sophisticated horn systems using several components such as springs, contacts, electrical circuits and so forth. That is, the horn systems are complex and thus, the manufacturing thereof is time consuming. Furthermore, the relatively high number of required components significantly increases the costs of conventional horn systems.

SUMMARY OF THE INVENTION

It is therefore an object of the present invention to provide a horn system for a vehicle, which has a simple reliable structure and which is thus easy to assemble and cost efficient.

As a solution of the above object, the present invention provides a horn system for a vehicle comprising the features of claim 1. The horn system comprises an airbag module and a cover for receiving and covering the airbag module, wherein the cover is moveable relative to the airbag module usually in a vertical direction, and a horn circuit for producing a warning signal in response to moving the cover relative to the airbag module. The horn system of the present invention is characterised in that it comprises at least one conductive element attached to a housing of the airbag module and displaceable between an assembling position and a holding position, wherein the conductive element is configured to interact with the cover in the holding position.

It is an important aspect of the present invention to provide a horn system which requires only a conductive element attached to the housing of the airbag module in order to activate the horn circuit for producing the warning signal. This is achieved by means of the interaction of the conductive element and the cover in the holding position of the conductive element. Thus, the horn system according to the present invention has a simple structure and can easily be assembled and adjusted. The adjustment of the horn system can be done easily by changing the type of conductive element. For example, a threshold pressure load, which is necessary to activate the horn system, may be increased by using a conductive element having a higher stiffness and is thus less flexible. The horn system of the present invention uses a minimum number of components and thus has a simple structure. Furthermore, the horn system of the present invention requires less space compared to conventional horn systems.

In a preferred configuration of the invention, the at least one conductive element is configured to interact with the horn circuit in the holding position upon movement of the cover relative to the housing. Preferably, the at least one conductive element is formed as a substantially flat metal sheet, which is bendable in the movement direction of the cover.

In an alternative configuration, the at least one conductive element is formed as a metal sheet that is bent to form a three-dimensional structure.

Still in an alternative configuration, the at least one conductive element is formed from a wire that is bent to form a flat (substantially two-dimentional) or a three-dimensional structure.

Still in an alternative configuration, the at least one conductive element is formed, in particular cast, forged, or assembled to from flat (substantially two-dimentional) or a three-dimensional structure.

In any of these configurations, the at least one conductive element may consist of or comprise a metal (or other conductive) portion and/or may comprise a non-conductive, but preferably bendable, second portion, in particular made from synthetic materials, such as, e.g., resin.

Furthermore, the at least one conductive element may in the holding position touch a bottom rim of the cover. Owing to this configuration, the at least one conductive element has a double function, wherein a first function refers to the cover holder function, in which the conductive element holds the cover in a correct vertical position, ensuring best flush and gap conditions with the environment. Secondly, the at least one conductive element provides a horn system function, since the at feast one conductive element is constructed to close the horn circuit upon movement of the cover relative to the housing of the airbag module.

In a further preferred configuration, the at least one conductive element is arranged substantially parallel to an outer surface of the housing and is preferably releasable attached thereto. Furthermore, the at least one conductive element may be flexible or bendable in a direction of movement of the cover. That is, by moving the cover, the at least one conductive element will be bent and can thus get in contact with a horn circuit for producing a warning signal. Preferably, in the holding position, a distal portion of the at least one conductive element is positioned adjacent to an activation zone of the horn circuit, wherein the horn circuit is preferably attached to the housing of the airbag module. Additionally, the at least one conductive element may bias the cover in the holding position, so that the cover is held in a nominal position. In order to provide a reliable activation of the horn circuit, the at least one conductive element is preferably located between the activation zone of the horn circuit and an outer surface of the housing. Furthermore, the reliability of the horn system can be further improved, if a plurality of conductive elements is provided, in particular three conductive elements, which are substantially regularly distributed over an outer surface of the housing, wherein the outer surface of the housing faces the steering wheel in an assembled state of the horn system. Of course, two, four, five or more contacts can be provided at suitable locations, too. Furthermore, the at least one conductive element is preferably adapted to contact the activation zone of the horn circuit upon movement of the cover with the predetermined load. In a preferred configuration, the at least one conductive element is slidingly connected to the housing of the airbag module.

In a further preferred configuration, the at least one conductive element is connected to the carrier plate or housing of the airbag module, so that it projects beyond a circumferential edge of the carrier plate or housing in a holding or activation position and so that it does not project beyond the circumferential edge of the carrier plate or housing in an assembling position.

In a further preferred configuration, the at least one conductive element is connected to the carrier plate or housing of the airbag module by means of a fixation connection, preferably a snap-in arrangement, formed at the carrier plate or housing, so that conductive element is in electrical connection with a connection path of the horn circuit which is arranged at the carrier plate or housing during both of its positions, namely during its holding or activation position and during its assembling position.

In a further preferred configuration, the at least one conductive element is configured to be fixedly connected to the carrier plate or housing in its holding or activation position of the airbag module via at least one projection, preferably being formed by a bolt/nut arrangement.

In a further preferred configuration, the at least one conductive element comprises at least one longitudinal opening in a z direction vertical to its gliding direction g which is configured to receive the projection, preferably being formed by a bolt/nut arrangement ant to retain it therein in both of its positions, namely during its holding or activation position and during its assembling position.

In a further preferred configuration, the at least one conductive element is glidingly sandwiched between a connection path being part of the horn circuit and second protrusions protruding from an outer surface of the carrier plate or housing.

In a further preferred configuration, conductive elements having a single tongue for contacting a contact section of the horn circuit and/or conductive elements having a plural, preferably two, tongues for contacting plural contact sections of the horn circuit are provided and, wherein preferably, the contact sections of the horn circuit are substantially regularly distributed over an outer surface of the carrier plate or housing or a surface of the steering wheel.

In a further preferred configuration of the invention, the housing of the airbag module substantially closes an open end of the cover. Additionally, the at least one conductive element preferably projects beyond a circumferential edge of the housing in the holding position and does not project beyond the circumferential edge of the housing in the assembling position. The cover can be advantageously attached to the airbag module and in particular to the housing by means of respective snap-on or any other suitable fixing device, which allows for a relative movement of the cover relative to the airbag module.

As a solution of the above object, the present invention also provides for an air bag module, which comprises the features of a horn system according to the present invention, in particular as described above and the claims.

As a solution of the above object, the present invention also provides for a Horn system for a vehicle, comprising a steering wheel, an airbag module having a carrier plate or housing for carrying an airbag and a cover for covering the airbag, wherein at least the cover is movable relative to the steering wheel, and a horn circuit for producing a warning signal in response to moving the cover relative to the steering wheel, wherein the horn system comprises at least one conductive element attached to the airbag module and displaceable between an assembling position and a holding position, wherein the conductive element is configured to interact with the steering wheel In the holding position.

This inventive solution provides a floating module concept, wherein a first part of the horn circuit (first contacts) can be provided on a steering wheel and a second part of the horn circuit (second horn contacts) are provided on the airbag module.

Of course, this solution can be combined with all the preferred embodiments as described above and in the dependent claims.

As a solution of the above object, the present invention also provides for a vehicle, in particular an automotive vehicle, which comprises the features of claim 15. In particular, the vehicle comprises a horn system according to the present invention.

Another aspect of the invention is the provision of a Conductive element for a Horn system of an Airbag Module, in particular for an automotive vehicle, which is formed of a metal sheet that is bent to form a three-dimensional structure to be flexible in a direction z of movement of the conductive element and which comprises at least one longitudinal opening in the z direction vertical to a gliding direction g of the conductive element which opening is configured to receive a projection for fixation of the conductive element.

Figure 2:
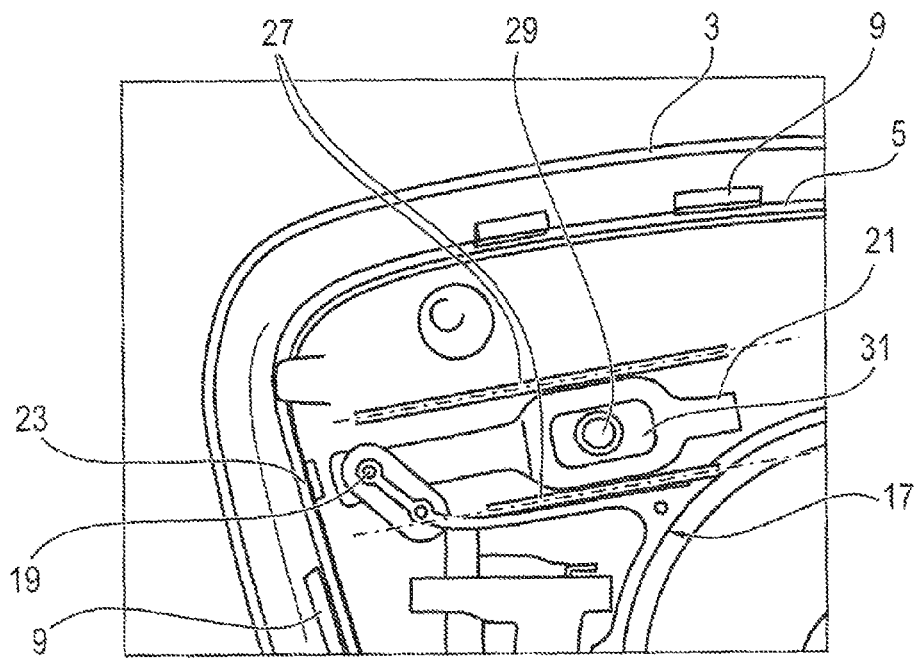
Figure 3:
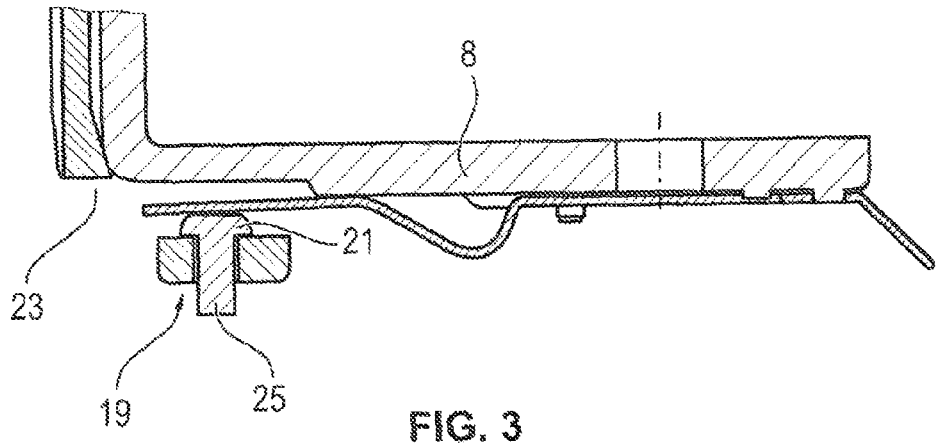
Figure 4:
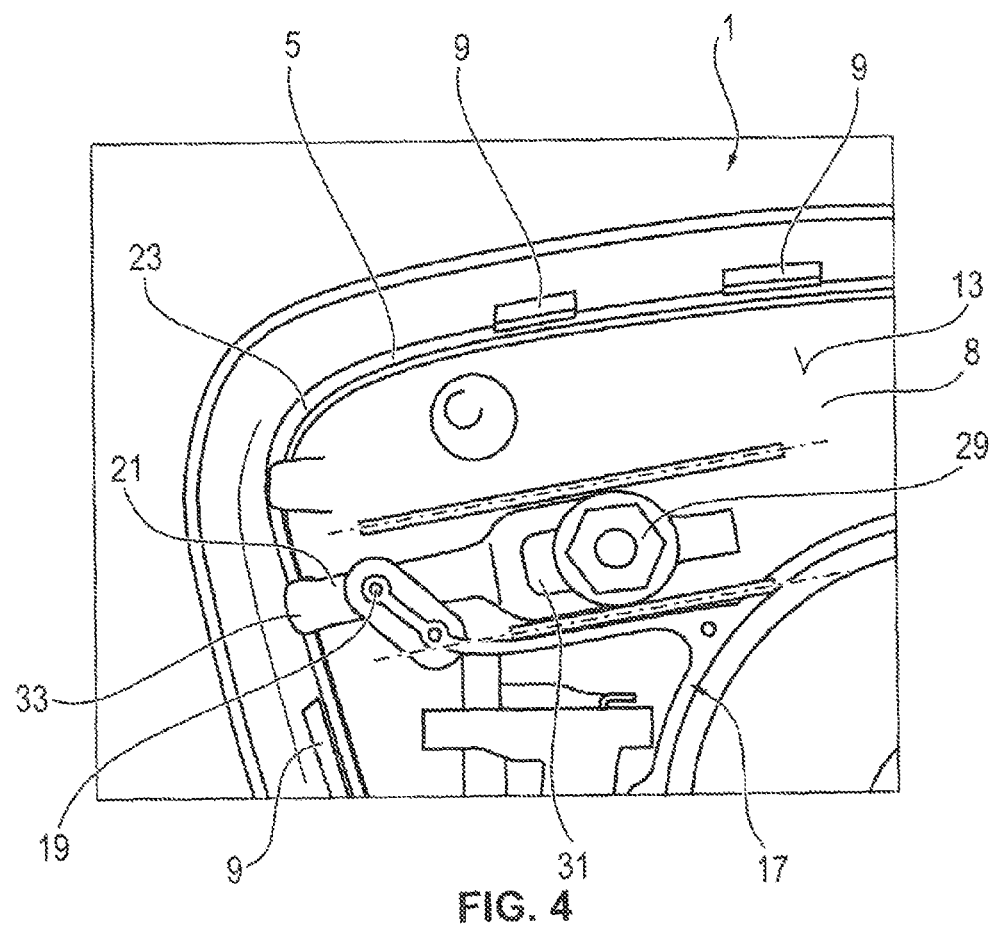
Figure 5:
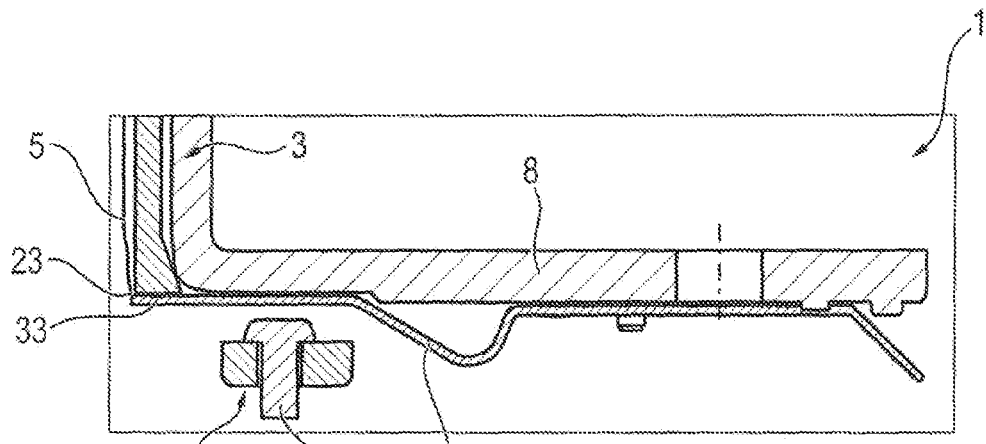
Figure 6:
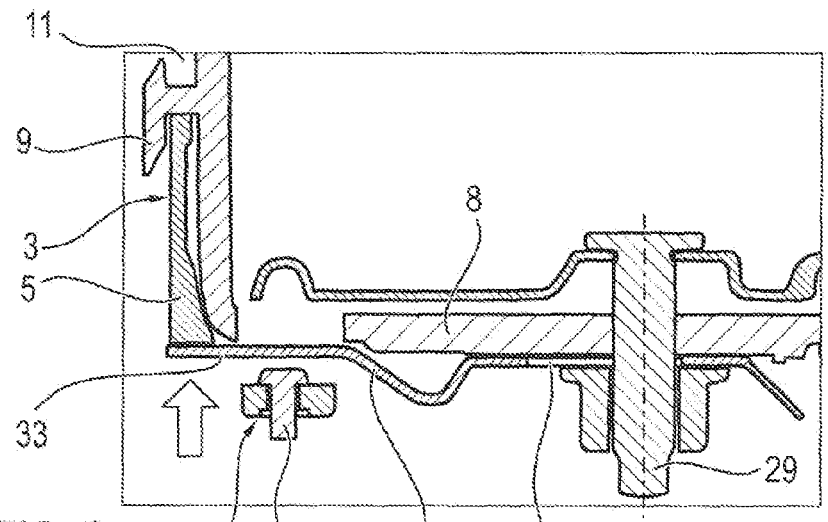
Figure 7:
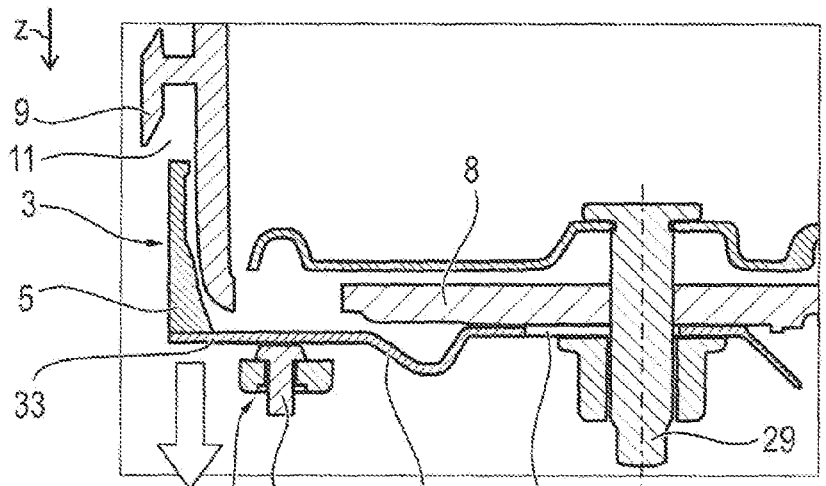

The invention is in the following explained by means of the drawings, which are as follows:

FIG. 1 A schematic perspective view of the horn system according to the invention;

FIG. 2 A perspective view of a detail of the horn system according to FIG. 1;

FIG. 3 A schematic cross-sectional view of the detail of FIG. 2;

FIG. 4 A perspective view of a detail of the horn system according to FIG. 1;

FIG. 5 A schematic cross-sectional view of the detail of FIG. 4;

FIG. 6 A schematic cross-sectional view of a detail of the horn system in a holding position of the conductive element, and FIG. 7 A schematic cross-sectional view of a detail of the horn system during a horn activation of the conductive element.

Figure 8:
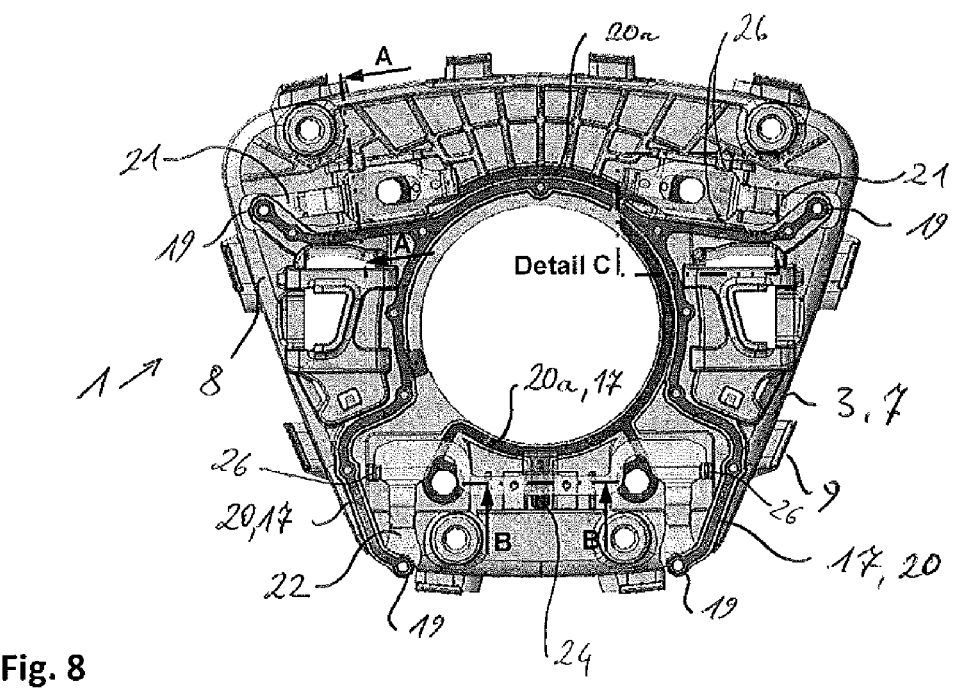
Figure 9:
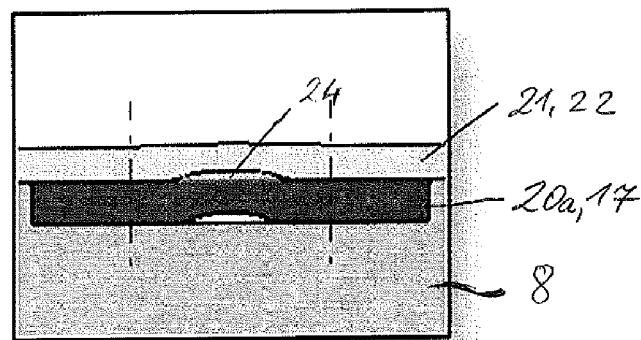
Figure 10:
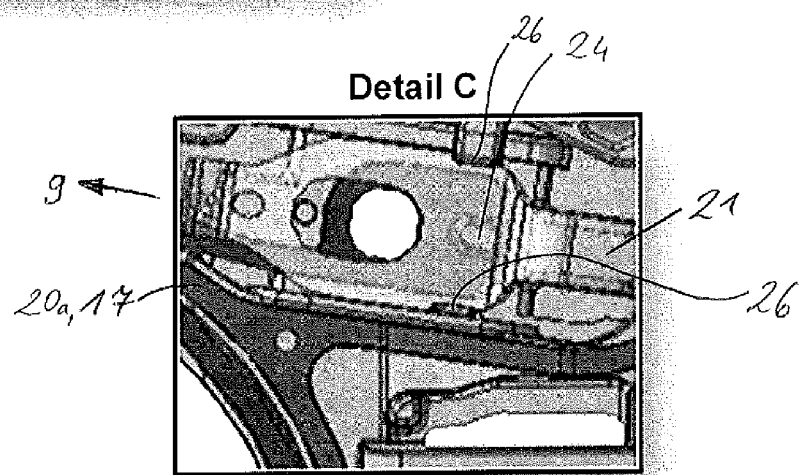

FIG. 8 A schematic perspective view of the horn system according to a second embodiment of the invention;

FIG. 9 A schematic cross-sectional view of details of FIG. 1 along lines A-A and B-B;

FIG. 10 An enlarged view of details of FIG. 1 in area C

Figure 11:
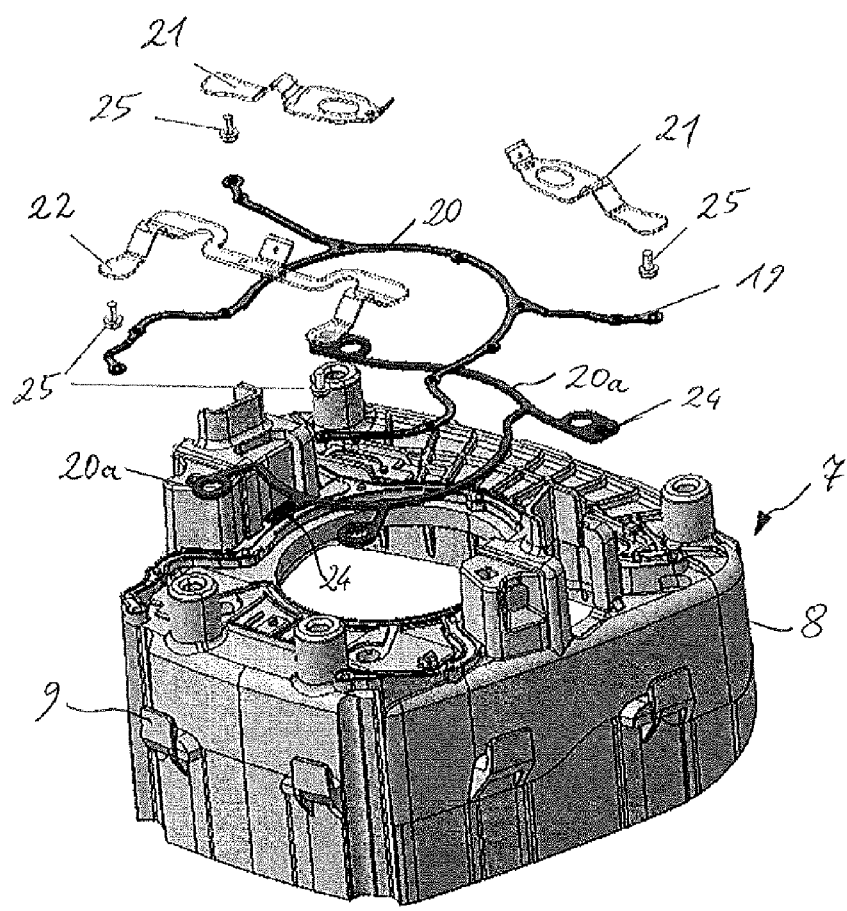

FIG. 11 A perspective exploded view of the horn system according to FIG. 8;

DESCRIPTION

FIG. 1 shows a schematic perspective view of a horn system 1 according to a first embodiment of the present invention. The horn system 1 comprises a bowl-shaped cover 3, which has a substantially trapezoidal cross-section. Four sidewslls 5 of the cover 3 surround an airbag module 7, wherein projections 9 on the peripheral wall of the airbag module 7 cooperate with corresponding openings 11 in the sidewalls 5 of the cover 3 in order to fix the airbag module 7 to the cover 3. A relative movement of the cover 3 with respect to the airbag module 7 is ensured in the assembled state of the two elements, since the height of the projections 9 in a vertical direction z is smaller than the height of the opening 11 in the vertical direction z. In the context of the present invention, the term "vertical direction" refers to a direction of the centre axis c of the cover and the airbag module, respectively. Furthermore, the airbag module 7 comprises a housing 8, which substantially closes an open end 10 of the cover 3, which is surrounded and defined by the sidewalls 5.

In the installed configuration of the horn system 1, the outer surface 13 of the housing 8 of the airbag module 7 faces a steering wheel of a vehicle and is preferably connected therewith. The outer surface of the cover 3 (not visible in FIG. 1) faces the driver of the vehicle. The horn system 1 further comprises an electrical connection 15 for triggering the airbag module 3 as well as a horn circuit 17 for producing a horn signal, when the horn circuit 17 is closed. In the embodiment of FIG. 1, the horn system further comprises three activation zones 19, which form distal ends of the horn circuit 17, and which when contacted by conductive elements 21 close the horn circuit.

In the embodiment of FIG. 1 there are three conductive elements 21 provided, which are moveably positioned on the outer surface 13 of the housing 8. In particular, the conductive elements 21 can be moved between an assembling position and a holding position. In FIG. 1, the conductive elements 21 are located in their holding position, where they interact with the cover 3. More specifically, the conductive elements 21 in the holding position as shown in FIG. 1 touch a bottom rim 23 of the cover 3 and in particular of the sidewalls 5. The moving direction of the conductive elements 21 is preferably such that it includes an angle with the bottom rim 23. In particular, the moving direction of at least some of the conductive elements 21 is perpendicular to the direction of the bottom rims 23.

The three conductive elements 21 of FIG. 1 interact with three activation zones 19 of the horn circuit 17. (If more or less conductive elements are provided, more or less activation zones might be provided, too.) The activation zones 19 extend over the outer surface 13 of the housing 8 and are electrically connected with each other. As can be seen from FIG. 1, the three conductive elements 21 are substantially regularly distributed over the surface 13 of the housing 8. Furthermore, it can be seen that three of the four sidewalls 5 of the cover 3 are associated with a dedicated conductive element 21. The activation zones 10 are preferably connected to each other via respective connection paths 20 to form the horn circuit 17.

FIG. 2 shows a perspective view of a detail of the horn system 1 according to the invention. As can be seen, the conductive element 21 is located in an assembling position. In the assembling position, the conductive element 21 does not project over the periphery of the housing 8. Furthermore, the cover 3 can receive the airbag module 7 in the assembling position of the conductive element. Since the conductive element 21 does not cover the bottom rim 23 of the sidewall 5, the cover 3 may even perform an additional movement in the vertical direction z during the cover assembly.

FIG. 3 shows schematic cross-sectional view of the assembling position of the conductive element 21. As can be seen, the conductive element 21 is positioned between the housing 8 of the airbag module 7 and an activation zone 19 of the horn circuit 17 comprising a rivet 25 for contacting the conductive element in a holding position thereof. In particular, the conductive element 21 is substantially flat and arranged in parallel with the outer surface 13 of the housing 3. In a preferred configuration, the conductive element 21 is in sliding contact with the housing 8.

Furthermore, the outer surface 13 of the housing 8 preferably comprises lateral guides 27 for guiding the conductive element 21 in a direction perpendicular to the direction of the bottom rim 23. The guides 27 may be integrally formed in the housing 8 and extend in form of longitudinal projections over the outer surface 13 of the housing 8. In order to adjust the horn system, the conductive element is preferably releasably connected (e.g. screwed or clipped) to the housing 8 such that the conductive element may simply be replaced.

In the present embodiment, the conductive elements are formed as elongated flat metal sheets, which extend in a direction perpendicular to the direction of the bottom rim 23. For limiting the movement of the conductive element 21 from an assembling position as shown in FIG. 2 to a holding position of FIG. 1, the housing 8 may comprise a projection 29, which may be a screw or rivet or the like, which extends in an elongated through hole 31 of the conductive element 21. The travel path of the conductive element 21 is limited by the projection 29 and the longitudinal dimension of the through hole 31, wherein the direction of movement of the conductive element 21 is determined by the direction and orientation of the guiding structure 2.

In another embodiment, the conductive elements 21 may be formed as conductive eccentric elements, which are rotatably mounted on the housing 8. These elements may be moved from an assembling position to a holding position by turning or rotating the eccentric element such that an eccentric portion of the conductive element covers the bottom rim 23 of cover 3. Similar to the flat elongated metal sheets, the eccentric conductive elements are located in the vicinity of the peripheral edge of the housing 8 and thus, close to the bottom rim 23 of cover 3.

FIG. 4 shows the horn circuit 1 according to the present invention in a holding position of the conductive element 21. In this position of the conductive element 21, a distal portion 33 of the conductive element 21 projects over the peripheral edge of the housing 8 and covers the bottom rim 23 of the cover 3. In this position, the conductive element 21 limits the movement of cover 3 relative to the airbag module 7 in the vertical direction z in the event that no predetermined load is subjected to the cover 3.

FIG. 5 shows a schematic cross-sectional view of the detailed view of FIG. 4. It can clearly be seen that the conductive element 21 in the holding position flushes with the outer rim 23 and the sidewalls 5 of cover 3. In this position, the conductive element 21 holds the cover 3 in a nominal position, which is the normal position of the cover 3, when no pressure is exerted on the cover 3 in the vertical direction z. Preferably, the conductive element 21 biases the cover 3 by means of a reaction force and thereby holds up the cover in the nominal position.

FIG. 6 shows a more detailed view of the holding position of the conductive element 21 according to FIG. 5. As can be seen from FIG. 6, the conductive element 21 in the holding position is located directly next to the bottom rim 23 of the sidewalls 5 of the cover 3. Owing to this configuration, the projection 9 of the housing 8 is located on the upper end of the opening 11 in the sidewall 5 of the cover 3.

FIG. 7 illustrates a state of the horn system 1, in which the cover 3 is manually pushed by a vehicle driver in a direction z, such that the cover 3 is moved relatively with respect to the projection 9 and the overall housing of the airbag module 7. Owing to the movement of the cover 3 in the direction z, a pressure is exerted on the distal portion 33 of the conductive element 21. Thereby, the conductive element 21 is displaced in the direction z and touches the rivet 25, which faces the conductive element 21 in the distal portion thereof. Preferably, the rivet 25 of the activation zone 19 is located in a small distance from the conductive element 21 in a non-activated state thereof. Therefore, the cover 3 needs only to be pushed with a predetermined threshold force such that the conductive element 21 bends or flexes towards the activation zone 19 of the horn circuit 17.

As can further be seen from FIG. 7, the conductive element 21 is located between the cover 8 and the activation zone 19 of the horn circuit 17, which is also attached to the housing 8. When the conductive element 21 touches the rivet 25 of the horn circuit 17, the horn circuit 17 is closed and a warning signal is produced. Again, it should be noted that a plurality of conductive elements 21 and corresponding dedicated activation zones 19 of a horn circuit 17 may be distributed over the outer surface 17 of a housing 8 to provide a reliable horn function.

FIGS. 8 to 10 describe a second embodiment of the invention which in most parts corresponds to the first embodiment of the invention. In the following only the features are explained which differ from the horn system of the first embodiment as described before in connection with FIGS. 1 to 7.

One such feature is that it comprises a plural-tongue conductive element 22. Like the three conductive elements 21 of FIG. 1, the plural-tongue conductive element 22 interacts with activation zones 19 of the horn circuit 17. However, the plural-tongue conductive element 22 interacts with plural activation zones 19. The function of the plural-tongue conductive element 22 corresponds to the function of the (single-tongue-) conductive element 21, as described before. (As pictured in FIG. 8, the plural-tongue conductive element 22 is configured to have two tongues and to interact with two activation zones 19. As can be seen from FIG. 8, one or more, in particular two (single-tongue) conductive elements 21 are over the surface 13 of the housing 8. Furthermore, one plural-tongue conductive element 22 is provided in addition. Of course, only plural-tongue conductive elements 22 may be present instead of the conductive elements 21. The activation zones 19 are preferably connected to each other via respective connection paths 20 to form one part of the horn circuit 17.

Another such feature (independent from the one just described) is that the single- and/or plural-tongue conductive elements 21, 22 are preferably connected to each other via respective connection paths 20a to form a second part of the horn circuit 17. Like the three conductive elements 21 of FIG. 1, the plural-tongue conductive element 22. As can be seen in FIG. 8, the conductive elements 21, 22 are located in an assembling position. In the assembling position, the conductive elements 21, 22 do not project over the periphery of the housing 8. Furthermore, the cover 3 (as pictured in FIG. 1, not shown in FIG. 8) can receive the carrier plate or housing 8 of the airbag module 7 in the assembling position of the conductive elements 21, 22. Since the conductive elements 21, 22 do not cover the bottom rim 23 of the sidewall 5 of the cover 3, the cover 3 may even perform an additional movement in the vertical direction z (see FIGS. 1, 7) during the cover assembly.

FIG. 9 shows schematic cross-sectional view of details of the conductive elements 21, 22 as indicated in FIG. 8 by lines A-A and B-B. As describe before along with FIG. 3, the conductive elements 21, 22 are positioned between the housing 8 of the airbag module 7 and an activation zone 19 of the horn circuit 17 comprising a rivet 25 for contacting the respective conductive element in a holding position thereof. In particular, the conductive element 21 is substantially flat and arranged in parallel with the outer surface 13 of the housing 8. In a preferred configuration, the conductive element 21 is in sliding contact with the housing 8.

In addition to this configuration, a portion of the connection path 20a is sandwiched between the conductive element 21, 22 outer surface 13 of the housing 8. At the area at which the conductive elements 21, 22 are neighboured to the connection path 20a, the connection path 20a (and/or the conductive elements 21, 22) have one or more protrusions 24 pointing towards the conductive elements 21, 22 (and/or the connection path 20a) so form electric contact connections there between.

Adjacent to the conductive elements 21, 22 the outer surface 13 of the housing 8 forms second protrusions which are configured to slidingly hold the conductive elements 21, 22 towards the connection paths 20a and their protrusions 24.

The conductive elements 21, 22 are movable from an assembling position towards a holding position.

Furthermore, it should be noted that depending on the amount of flexibility/bendability of the conductive element, the horn effort may be adjusted. That is, if the conductive element has a high degree of flexibility or elasticity, a low activation pressure is necessary to displace the conductive element towards the activation zone of the horn circuit. On the other hand, if the conductive element 21, 22 has a higher stiffness, a higher pressure must be asserted on the cover 3 in order to bend the conductive element and to produce a horn signal.

Furthermore, the conductive elements, in particular metal sheets, can be preassembled in the housing or fitted later during the assembly process of the driver airbag. It should be understood that the horn system may comprise one or more, in particular more than three conductive elements 21, 22 and a similar number of associated activation zones 19 of the horn circuit 17.

In conclusion, the present invention provides a reliable and cost efficient horn system for an airbag with a floating cover concept, wherein the cover floats with respect to the airbag module and activates a flexible or bendable conductive element, which is attached to the fixed housing 8. Furthermore, the manufacturing and assembling of such a horn system is significantly simplified due to the reduced number of required components.

LIST OF REFERENCE NUMERALS

1 Horn system
3 Cover
5 Sidewalls
7 Airbag module
8 Carrier Plate or Housing
9 Projections
10 Open end
11 Opening
13 Outer surface
15 Electrical connection
17 Horn circuit
19 Activation zone
20, 20a Connection path
21 (Single-tongue-) Conductive element
22 Plural-tongue Conductive element
23 Bottom rim
24 First protrusions
25 Rivet
26 Second protrusions
27 Guides
29 Projection
31 Through hole
33 Distal portion z Vertical direction
c Centre axis
g gliding direction

The invention claimed is:

1. Horn system (1) for a vehicle, comprising an airbag module (7) having a cover (3) for covering an airbag, wherein the cover (3) is movable relative to a carrier plate (8) of the airbag module (7), and a horn circuit (17) for producing a warning signal in response to moving the cover (3) relative to the carrier plate (8), wherein the horn system (1) comprises at least one conductive element (21, 22) attached to an underside of the carrier plate (8) and displaceable between an assembling position and a holding position, wherein the at least one conductive element (21, 22) is configured to interact with the cover (3) in the holding position.

2. Horn system according to claim 1,
wherein the at least one conductive element (21, 22) is configured to interact with the horn circuit (17) in the holding position upon movement of the cover (3) relative to the carrier plate (8) or a steering wheel.

3. Horn system according to claim 1, wherein the at least one conductive element (21, 22) is connected to the carrier plate (8) of the airbag module (7), so that it projects beyond a circumferential edge of the carrier plate (8) in a holding or activation position and so that it does not project beyond the circumferential edge of the carrier plate (8) in an assembling position.

4. Horn system according to claim 1, wherein the at least one conductive element (21, 22) is connected to the carrier plate (8) of the airbag module (7) by means of a fixation connection formed at the carrier plate (8), so that conductive element (21, 22) is in electrical connection with a connection path (20a) of the horn circuit (17) which is arranged at the carrier plate (8) during both of its positions, namely during its holding or activation position and during its assembling position.

5. Horn system according to claim 1, wherein the at least one conductive element (21, 22) is configured to be fixedly connected to the carrier plate (8) in its holding or activation position of the airbag module (7) via at least one projection (29) formed by a bolt/nut arrangement.

6. Horn system according to claim 5, wherein the at least one conductive element (21, 22) comprises at least one longitudinal opening in a (z) direction vertical to its gliding direction (g) which is configured to receive the projection (29) formed by a bolt/nut arrangement and to retain it therein in both of its positions, namely during its holding or activation position and during its assembling position.

7. Horn system according to claim 1, wherein the at least one conductive element (21, 22) is configured to contact a bottom rim (23) of the cover (3) or a steering wheel in the holding position.

8. Horn system according to claim 1, wherein the at least one conductive element (21, 22) is formed as a substantially flat, metal sheet, and/or in that the at least one conductive element (21, 22) is arranged substantially parallel to an outer surface (13) of the carrier plate (8).

9. Horn system according to claim 1, wherein the at least one conductive element (21, 22) is formed as a metal sheet that is bent to form a three-dimensional structure and/or, in that the at least one conductive element (21, 22) is formed from a wire that is bent to form a flat substantially two-dimensional or a three-dimensional structure and/ or, in that the at least one conductive element (21, 22) is cast, forged, or assembled to a flat substantially two-dimensional or a three-dimensional structure.

10. Horn system according to claim 1, wherein the at least one conductive element (21, 22) is flexible in a direction (z) of movement of the cover (3), wherein the at least one conductive element (21, 22) consists of or comprises a metal or other conductive portion and/ or comprises a non-conductive, bendable, second portion made from synthetic materials.

11. Horn system according to claim 1, wherein in the holding position, a distal portion (33) of the at least one conductive element (21, 22) is positioned adjacent to an activation zone (19) of the horn circuit (17), wherein the horn circuit (17) is attached to the carrier plate (8) of the airbag module (7) or to a steering wheel.

12. Horn system according to claim 1, wherein in the holding position, the at least one conductive element (21, 22) biases the cover (3) so that the cover (3) is held in a nominal position.

13. Horn system according to claim 1, wherein the at least one conductive element (21, 22) is located between an activation zone (19) of the horn circuit (17) and an outer surface (13) of the carrier plate (8).

14. Horn system according to claim 1, wherein the at least one conductive element (21, 22) is glidingly sandwiched between a connection path (20a) being part of the horn circuit (17) and second protrusions (26) protruding from an outer surface (13) of the carrier plate (8).

15. Horn system according to claim 1, wherein a plurality of conductive elements (21, 22) are provided and substantially regularly distributed over an outer surface (13) of the carrier plate (8) or a surface of a steering wheel.

16. Horn system according to claim 1, wherein the at least one conductive element (21) has a single tongue for contacting a contact section (25) of the horn circuit (17) and/or the at least one conductive element (22) has plural tongues for contacting plural contact sections (25) of the horn circuit (17) are provided and, wherein the contact sections (25) of the horn circuit (17) are substantially regularly distributed over an outer surface (13) of the carrier plate (8) or a surface of a steering wheel.

17. Horn system according to claim 1, wherein the at least one conductive element (21, 22) is adapted to contact the activation zone (19) of the horn circuit (17) upon movement of the cover (3) with a predetermined load, and/or in that the at least one conductive element (21, 22) is glidingly connected to the carrier plate (8) of the airbag module (7).

18. Horn system according to claim 1, wherein the carrier plate (8) of the airbag module (7) substantially closes an open end (10) of the cover (3).

19. Horn system according to claim 1, wherein the at least one conductive element (21, 22) projects beyond a circumferential edge of the carrier plate (8) in the holding position and does not project beyond the circumferential edge of the carrier plate (8) in the assembling position.

20. Airbag Module for an automotive vehicle comprising a horn system (1) according to claim 1.

21. Horn system according to claim 1, wherein the conductive element is formed of a metal sheet that is bent to form a three-dimensional structure to be flexible in a direction (z) of movement and which comprises at least one longitudinal opening in a (z) direction vertical to a gliding direction (g) of the conductive element which opening is configured to receive a projection (29) for fixation of the conductive element.

22. Horn system (1) for a vehicle, comprising a steering wheel, an airbag module (7) having a carrier plate or housing (8) for carrying an airbag and a cover (3) for covering the airbag, wherein at least the cover (3) is movable relative to the steering wheel, and a horn circuit (17) for producing a warning signal in response to moving the cover (3) relative to the steering wheel, wherein the horn system (1) comprises at least one conductive element (21, 22) attached to the airbag module (7) and displaceable relative to the airbag module while attached to the airbag module between an assembling position and a holding position, wherein the conductive element (21, 22) is configured to interact with the steering wheel only in the holding position.

* * * * *